United States Patent [19]

Zwisler et al.

[11] 3,904,751

[45] Sept. 9, 1975

[54] PROCESS FOR ISOLATING A FIBRIN STABILIZING FACTOR FROM HUMAN PLACENTA

[75] Inventors: Oswald Zwisler, Marbach near Marburg and der Lahn; Hans Biel, Marburg an der Lahn, both of Germany

[73] Assignee: Behringwerke Aktiengesellschaft, Marburg an der Lahn, Germany

[22] Filed: Jan. 17, 1974

[21] Appl. No.: 434,095

Related U.S. Application Data

[63] Continuation-in-part of Ser. No. 210,227, Dec. 20, 1971, abandoned.

[30] Foreign Application Priority Data

Dec. 22, 1970 Germany............................ 2063070

[52] U.S. Cl. ............................................. 424/105
[51] Int. Cl.²......................................... A61K 27/00
[58] Field of Search .................................... 424/105

[56] References Cited

UNITED STATES PATENTS 3,497,492  2/1970  Buck et al........................... 424/105

*Primary Examiner*—Frederick E. Waddell
*Attorney, Agent, or Firm*—Curtis, Morris & Safford

[57] ABSTRACT

A process for isolating a fibrin-stabilizing factor, factor XIII, by extracting human placentae with sodium chloride solution; adding diamino-ethoxy-acridine lactate (DEAL); recovering the resultant precipitate and dissolving it in dilute alkali metal chloride solution; adding a lower alcohol thereto to form a precipitate which is discarded; combining the supernatant solution with further lower alcohol to form a precipitate which is dissolved in an ethylene diamine tetraacetic acid-alkali metal hydroxide buffer; fractionating the resultant solution by gel filtration; chromatographing the active fractions; and dialyzing the eluate. The dialyzed solution, containing the active factor XIII, can be processed into dosage unit forms.

1 Claim, No Drawings

PROCESS FOR ISOLATING A FIBRIN STABILIZING FACTOR FROM HUMAN PLACENTA

The present application is a continuation-in-part of U.S. Ser. No. 210,227 filed Dec. 20, 1971, now abandoned.

The present invention relates to a process for isolating a fibrin-stabilizing factor from human placentae.

The fibrin-stabilizing factor, also referred to as factor XIII, plays an important part in blood clotting. If it is missing in the blood, heavy after-bleeding occurs upon injuries and healing of wounds is retarded. The lack of factor XIII may be hereditary or may be the result of diseases, for example cirrhosis of the liver, carcinoma, leukemia, or disseminated intravascular coagulation (DIC). These conditions may become a danger to life, especially for the new-born and for pregnant women, in whom the lack of factor XIII may lead to miscarriage.

These deficiency symptoms may be overcome by substitution, e.g. by the use of blood, plasma, or fibrinogenic preparations. However, these substances have to be infused in a large volume, which is undesirable in many cases and is troublesome and time-consuming. Moreover, accompanying proteins and blood-group substances are thus administered to the patient, which may cause incompatibility phenomena. Hence, there is demand for a preparation which has a high fibrin-stabilizing activity and which is, to a large extent, free from accompanying proteins and blood-group substances.

It is known in the art that factor XIII is contained in platelets and in blood plasma and can be isolated therefrom by precipitation with ammonium sulfate, heating, and diethyl-aminoethyl-cellulose (DEAE cellulose) chromatography. However, the concentration of the fibrin-stabilizing factor in plasma is low and the yield obtained by this known process is, therefore, poor. Further, the heating operation, during which factor XIII is separated from fibrinogen, can only be performed on small batches. Therefore, the process has not been adopted by industry nor gained any importance.

Moreover, plasma as a starting material is too expensive for the industrial preparation of factor XIII. For the same reason, platelets are refused as an industrial source for the production of factor XIII.

It has now been found that the fibrin-stabilizing factor can be isolated in good yield from human placentae.

According to the present invention, frozen human placental tissue is first extracted with dilute sodium chloride solution at a temperature between about 0°C. and about 20°C. The concentration of the sodium chloride solution may be between 0 percent and about 2 percent, preferably about 0.5 percent. As known to those skilled in the art, the amount of extracting solution employed is chosen large enough to bring about an effective extraction, but is kept small enough to avoid the handling of excessive amounts of solution. In general, for the present process, between about 0.5 and 1.5 liters of sodium chloride solution are employed per kilogram of tissue being extracted.

Any solid contaminants are removed from the resulting solution extract by conventional methods, e.g. by centrifugation.

Next, at a temperature of from about 5°C. to about 20°C., a dilute solution of diamino ethoxy acridine lactate (DEAL) is added at a pH from 5.0 to 7.5, preferably about 6.0. The solution, which preferably has a concentration between about 2 percent and 3 percent, is added in an amount such that the DEAL added is from 6 to 10 percent by weight, preferably about 8 percent, of the protein content of the extract. The protein content of the extract can be determined by the usual analytical methods for quantitative assay of proteins such as by refraction measurements or by the biuret method.

The resulting precipitate is recovered, e.g. by centrifugation, may optionally be washed several times with water, and is then dissolved in a dilute neutral alkali metal chloride solution having a concentration between about 1.5 and about 3 percent, preferably 2 percent. The alkali metal chloride is preferably sodium chloride, but potassium chloride may also be used. The temperature of this solution is preferably between 10° and 25°C. 12 to 20 percent by volume of a lower alcohol, e.g. methanol, ethanol or isopropanol, preferably ethanol, is added at a temperature between 10°C and 25°C, preferably 20°C. The resulting precipitate is separated by centrifugation or filtration and discarded.

To the clarified supernatant solution water is added at a temperature between 10°C and 25°C to reduce the alkali metal chloride concentration to not more than 2 percent, and preferably to about 1 percent. The resulting solution is then combined at a temperature between −5° and +5°C, preferably at 0°C, and at a pH from 5.5 to 6.5, preferably about 5.8, adjusted by the addition of about 0.5 M acetic acid, with 12 to 20 percent by volume of a lower alcohol, preferably ethanol.

The resulting precipitate is next suspended in a neutral buffer solution of about 0.1% ethylene diamine tetraacetic acid (EDTA) and an equivalent amount of an alkali metal hydroxide.

Said buffer containing 0.5–3%, preferably 1%, of NaCl, 0.05–0.2%, preferably 0.1% of $NaN_3$ and 0.2–2%, preferably 0.5% of glucose.

This step is performed at a temperature between 0°C and 10°C, preferably about 0°C. Any insoluble residue which remains is eliminated, for example by centrifugation and the remaining solution is fractionated at a temperature between 5°C and 25°C by gel filtration in a chromatography column filled with a gel filtration medium with a fractionation range for linear molecules between molecular weights from 1000 to 150,000. Preferably "Sephadex", a commercially available product of Pharmacia, Uppsala, is used, which is a cross-linked dextran. The elution is performed with EDTA/NaOH buffer as described above but without any contents of sodium chloride.

The fractions so obtained are analyzed using the fibrin-stabilizing factor test described below and those showing an activity of more than 10 units are combined.

The active fractions are then chromatographed at a temperature between 5°C and 25°C on a cellulosic ion exchanger with basic ionizable groups, preferably with diethylaminoethyl as ionisable group (DEAE-Cellulose). The column is eluted with twice the volume of the ion exchanger of a neutral 0.3–1.0% solution of NaCl containing epsilon-amino-caproic acid from 0.05% to 0.5%.

The resulting eluate is then dialyzed against a neutral sodium phosphate buffer comprising $Na_2HPO_4$ and $NaH_2PO_4$ having a concentration from 0.01 to 0.02 percent, preferably about 0.015 percent, at a temperature between 5°C and 25°C. The sodium phosphate buffer contains 0–2%, preferably 0.5%, of glucose.

If necessary or desirable, a stabilizer is next added to the dialyzed solution (solution remaining after dialysis). The solution may then be filtered under sterile conditions, standardized, lyophilized, and put into dosage unit forms. Suitable stabilizers for use in the last step are, for example, human albumin or gelatin which has been degraded by hydrolysis and cross-linked with a diisocyanate (available commercially under the tradename "Haemaccel").

The fibrin-stabilizing factor isolated according to the present invention from human placentae does not typically differ from the platelet factor XIII but it differs from the plasma factor XIII. Comparative chemical and physico-chemical data are compiled in the following Table.

TABLE

|  | Fibrin-stabilizing factor obtained from | | |
|---|---|---|---|
|  | plasma | platelets | placenta |
| sedimentation coefficient | 8.4 S | 7.4 S | 7.2 S |
| molecular weight | 300.000 | 150,000–200,000 | 165,000 |
| carbohydrate content in % | 4.9 | 1.5 | 1.47 |
| hexoses | 1.9 | 1.2 | 0.98 |
| fucose | 0.2 | 0.0 | 0.0 |
| hexosamine (N-acetyl-) | 1.6 | 0.16 | 0.28 |
| neuraminic acid (N-acetyl-) | 1.2 | 0.15 | 0.21 |
| amino acid radicals per 100 amino acids |  |  |  |
| lysine | 6.3 | 5.7 | 5.1 |
| histidine | 2.5 | 2.0 | 1.9 |
| arginine | 5.5 | 6.2 | 6.2 |
| aspartic acid | 10.4 | 12.2 | 12.2 |
| threonine | 7.2 | 5.9 | 6.2 |
| serine | 7.2 | 5.8 | 6.1 |
| glutamic acid | 12.7 | 10.8 | 11.0 |
| proline | 5.7 | 4.6 | 4.9 |
| glycine | 7.9 | 7.1 | 7.0 |
| alanine | 4.1 | 5.3 | 5.3 |
| valine | 7.5 | 9.9 | 9.7 |
| methionine | 2.0 | 2.6 | 2.6 |
| isoleucine | 4.8 | 5.2 | 5.0 |
| leucine | 7.3 | 6.8 | 6.7 |
| tyrosine | 5.0 | 4.2 | 4.4 |
| phenyl-alanine | 3.9 | 4.5 | 4.6 |
| ½ cysteine | ? | 1.2 | 1.1 |

The activity of the fibrin-stabilizing factor is conveniently determined by a dilution test (cf. Thromb diathes. haemorrh. 23, 455 (1970)). In the test, use is made of the different solubility, in a 1 percent aqueous chloroacetic acid solution, of cross-linked fibrin and fibrin that is not cross-linked because of a lack of fibrin-stabilizing factor. Using thrombin, fibrinogen free of factor XIII, and increasingly-diluted samples of the solution of factor XIII to be determined, fibrin clots are formed having different degrees of cross-linking. These clots are then incubated with a 1 percent solution of chloroacetic acid. The dilution in which the fibrin clot is just still preserved is determined to be the factor-XIII concentration which is just sufficient for cross-linking. In the next higher dilution, the fibrin clot dissolves. Samples having preserved clots are considered to be active.

Ordinary human mixed plasma serves as a reference substance. The factor-XIII activity contained in 1 ml of human mixed plasma is defined as "one unit." The fibrin-stabilizing activity desired is calculated from the ratio of the limit values for the dilution of mixed plasma and the solution to be tested.

The factor XIII obtained according to the present invention can be used to treat any factor-XIII deficiency symptoms, for example the inherited lack thereof and any haemorrhagic syndromes resulting therefrom, bleeding and disturbances in the healing of wounds, as well as any transitory lack of factor XIII, for example after an operation and a retarded healing of wounds resulting therefrom. A solution containing the factor XIII is injected intravenously, advantageously in an amount corresponding to the factor-XIII activity of 250 ml of fresh human plasma. Where required, 4 times this amount may be administered.

A better understanding of the present invention and of its many advantages will be had by referring to the following Example, given by way of illustration.

EXAMPLE I 50 kg of frozen human placentae were cut into small pieces and mixed, while stirring, with 50 liters of a 0.5 percent sodium chloride solution at a temperature of 0°C.

The mixture was heated to +10°C and centrifuged. A 3 percent solution of DEAL (commercially available under the tradename "Rivanol") was added to 45 liters of this extract in an amount providing 8 grams of DEAL per 100 g of protein therein.

The resulting precipitate was suspended in water at a pH of 7 and 20 percent sodium chloride solution was added at a temperature of 20°C until a concentration of NaCl of 2 percent was reached in the mixture. After stirring for 15 minutes, 4.55 liters of ethanol were added at 20°C, and stirring was continued for 1 hour. The solution was centrifuged and any residue was discarded.

The supernatant solution containing the active fibrin-stabilizing substance was clarified by adding 1 g charcoal, stirring 30 min. and removing the charcoal by centrifugation. The sodium chloride concentration in the supernatant was then reduced to 1 percent by the addition of water at 20°C. The solution was cooled to 0°C and 3.7 liters of ethanol were added with stirring. The pH was adjusted to 5.8 with 0.5 M acetic acid. The solution was then centrifuged. The supernatant solution was poured off and discarded. The residue was homogenously suspended in 100 ml of EDTA-sodium hydroxide buffer cooled to 0°C at a pH of 7.0, said buffer containing 0.1 percent of EDTA adjusted to pH 7.0 with 0.5 M NaOH, 1 percent of sodium chloride, 0.1 percent of sodium azide, and 0.5 percent of glucose. Thereafter the pH was re-adjusted to 7.0 by addition of 0.5 M NaOH.

By adding solid sodium chloride the NaCl concentration in the solution was now increased to 2 percent at a temperature of 0°C and insoluble material was separated by centrifugation.

The supernatant solution was fractionated at 20°C by means of Sephadex G 150 (Pharmacia Uppsala) and eluted with a buffer containing 0.1% EDTA adjusted with 0.5 M NaOH to pH 7.0, 0.005 mol of EDTA per liter and 0.1 percent of sodium azide and 0.5% of glucose. The eluate was gathered in a fraction collector. The activity of the fractions was then determined using the fibrin-stabilizing test earlier described herein and those fractions having an activity greater than 10 units were combined. The combined active fractions contained about 1200 mg of protein. 24 ml of solid, wet DEAE cellulose were added to the combined active fractions to which the active protein was adsorbed.

50 ml of a solution of 0.6 percent sodium chloride and 0.1 percent of $\epsilon$-amino caproic acid at a pH of 7.0 and a temperature of 20°C were used for elution. The eluate was dialyzed for 24 hours at a temperature of 5°C against 50 liters of a 0.015 percent sodium phosphate buffer at a pH of 7.0 containing 5 mg of glucose per milliliter.

For the preparation of a dosage unit form to each milliliter of the dialyzed solution were added 8.5 mg NaCl and 10 mg human albumin. Then the solution was filtered under sterile conditions through an aseptic filter.

The fibrin-stabilizing activity of the solution was determined in comparison with human plasma and the solution was diluted with physiological sodium chloride solution containing 0.5 % glucose to an extent that the activity of 4 ml of solution corresponded to the activity of 250–300 ml mixed plasma.

10 ml of 20 percent human albumin were also added per 250 ml of the diluted solution. After filtration under sterile conditions, the filtrate was drawn off in portions of 4 ml each and lyophilized.

The total amount of fibrin-stabilizing active substance obtained from 50 kg of placentae provided 241 packages each having a factor XIII activity corresponding to 250 ml of human mixed plasma. The total amount of factor XIII therein corresponds to that which would be obtained from more than 120 liters of blood.

Since the activity of the starting material is not always the same, the yields obtained may vary. For example, from an analogous batch containing 45 liters of placental extract, 147 dosage units each having the activity of 250 ml of fresh plasma were obtained, corresponding to the factor XIII obtainable from more than 70 liters of blood.

What is claimed is:

1. A process for isolating a fibrin-stabilizing factor which comprises:

a. extracting human placentas with a dilute aqueous sodium chloride solution at a temperature between 0°C. and 10°C. and removing solid contaminants from the extract;

b. adding a dilute aqueous solution of diaminoethoxy-acridine lactate to said extract at a temperature of 10°C. and at a pH between 5.0 and 7.5 in an amount furnishing about 6 to 10 grams of said lactate per 100 grams of protein content in said extract to form a first precipitate, and isolating said first precipitate;

c. dissolving said first precipitate at a temperature between 10°C. and 25°C. by treating it with from 1.5 to 3 percent of an alkali metal chloride in a neutral aqueous medium;

d. adding from 12 to 20 percent by volume of a lower alcohol to said aqueous chloride medium at a temperature from 10°C. to 25°C. to form a second precipitate, and isolating and discarding said second precipitate;

e. clarifying the remaining supernatant liquid, diluting it with water to an alkali metal chloride concentration below 2 percent, adding thereto from 12 to 20 percent by volume of a lower alcohol at a temperature between −5°C. and 5°C. at a pH from 5.5 to 6.5 to form a third precipitate, and isolating said third precipitate;

f. suspending said third precipitate at about 0°C. in a neutral ethylene diamine tetraacetic acid/alkali metal hydroxide buffer containing from 0.5 to 3 percent of sodium chloride, 0.2 to 2 percent of glucose, and 0.05 to 0.2 percent of sodium azide, and removing any insoluble matter;

g. gel filtering the resultant solution in a chromatographic column filled with a gel filtration medium with a fractionation range for linear molecules between molecular weights of 1000 to 150,000 and collecting the active fractions having an activity of more than 10 units of fibrin-stabilizing factor and combining them;

h. chromatographing said collected active fractions on diethylaminoethyl cellulose using a neutral 0.3 to 1.0 percent solution of sodium chloride containing from 0.05 to 0.5 percent of epsilon-amino-caproic acid as the eluant; and i. dialyzing the eluate against a 0.01 to 0.02 percent neutral sodium phosphate buffer containing 0 to 2 percent of glucose and retaining the dialyzed eluate.

* * * * *